(12) United States Patent
Bayes et al.

(10) Patent No.: US 12,027,281 B2
(45) Date of Patent: Jul. 2, 2024

(54) METALLIC STRUCTURE WITH DESIRED COMBINATIONS OF MECHANICAL AND ELECTRICAL CHARACTERISTICS

(71) Applicant: TE Connectivity Services GmbH, Schaffhausen (CH)

(72) Inventors: Martin W. Bayes, Hopkinton, MA (US); Gokce Gulsoy, San Jose, CA (US); David Patrick Orris, Middletown, PA (US); David Bruce Sarraf, Elizabethtown, PA (US); Chad William Morgan, Carneys Point, NJ (US); Jevon Ryan Corban, Middletown, PA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 869 days.

(21) Appl. No.: 16/816,595

(22) Filed: Mar. 12, 2020

(65) Prior Publication Data
US 2020/0294685 A1    Sep. 17, 2020

Related U.S. Application Data

(60) Provisional application No. 62/817,098, filed on Mar. 12, 2019.

(51) Int. Cl.
| | | |
|---|---|---|
| H01B 1/02 | (2006.01) | |
| B32B 7/00 | (2019.01) | |
| B32B 7/025 | (2019.01) | |
| H01B 1/04 | (2006.01) | |
| H01B 13/00 | (2006.01) | |
| H01R 13/58 | (2006.01) | |

(Continued)

(52) U.S. Cl.
CPC ............ *H01B 1/026* (2013.01); *B32B 7/025* (2019.01); *H01B 1/04* (2013.01); *H01B 13/0016* (2013.01); *H01R 13/5808* (2013.01); *H01R 13/621* (2013.01); *H01R 25/145* (2013.01); *B32B 2307/302* (2013.01)

(58) Field of Classification Search
CPC . H01B 1/00; H01B 1/04; H01B 1/026; H01R 13/03; H01R 13/621; B32B 7/025; B32B 7/027
See application file for complete search history.

(56) References Cited

U.S. PATENT DOCUMENTS 9,526,195 B2 * 12/2016 Su ...................... H05K 9/0088
10,173,253 B2    1/2019 Nayfeh et al.
(Continued)

FOREIGN PATENT DOCUMENTS

CN        201608140 U    10/2010
CN        201937220 U     8/2011
(Continued)

OTHER PUBLICATIONS

Kaplas et al "Few-layer graphene synthesis on a dielectric substrate", Carbon 50 (2012) 1503-1509.*
(Continued)

*Primary Examiner* — Mark Kopec

(57) ABSTRACT

The present invention relates to metallic structure with desired combinations of mechanical and electrical characteristics formed of a higher electrical conductivity element with a mechanically stronger element.

11 Claims, 7 Drawing Sheets

(51) Int. Cl.
  *H01R 13/621*    (2006.01)
  *H01R 25/14*     (2006.01)

(56)           References Cited

U.S. PATENT DOCUMENTS

| | | | |
|---|---|---|---|
| 2013/0248229 A1* | 9/2013 | Martens | H01B 1/026 |
| | | | 228/115 |
| 2013/0292161 A1* | 11/2013 | Liu | C25D 5/022 |
| | | | 977/734 |
| 2014/0352869 A1 | 12/2014 | Wasynczuk | |
| 2015/0333424 A1* | 11/2015 | Elsbernd | H01R 13/03 |
| | | | 427/122 |
| 2018/0102197 A1 | 4/2018 | Adams | |
| 2018/0330842 A1 | 11/2018 | Rastogi et al. | |
| 2019/0173147 A1* | 6/2019 | Yoon | C30B 23/04 |
| 2022/0199280 A1* | 6/2022 | Lekarski | H01B 13/0165 |

FOREIGN PATENT DOCUMENTS

| | | | |
|---|---|---|---|
| CN | 102560415 A | 7/2012 | |
| CN | 103429333 A | 12/2013 | |
| CN | 105097063 A | 11/2015 | |
| WO | 2017065530 A1 | 4/2017 | |

OTHER PUBLICATIONS

Cho et al "Growth of monolayer graphene on nanoscale copper-nickel alloy thin films", Carbon 115 (2017) 441-448.*
Sandoz-Rosado et al "Reducing contact resistance of macro-scale separable electrical contacts with single-layer graphene coatings", IEEE 2014.*
Kuznetsova et al "Calculation of the RF Conductivity and Hall Constant of a Thin Metal Film", Technical Physics, 2017, vol. 62, No. 12, pp. 1766-1771.*
Shi et al "New Efficient Method of Modeling Electronics Packages With Layered Power/Ground Planes", IEEE Transactions on Advanced Packaging, vol. 25, No. 3, Aug. 2002.*
Dai et al "Electrodeposited CoCu/Cu meta-conductor with suppressed skin effect for next generation radio frequency electronics", Journal of Alloys and Compounds 778 (2019) 156-162.*
Lee, Dominic F and Burwell, Malcolm, "Priority Research Areas to Accelerate the Development of Practical Ultraconductive Copper Conductors", ORNL/TM-2015/403, Sep. 2015.
Search Report—CN Office Action, Application No. 2020101694250, dated May 25, 2021, pp. 8-9.

* cited by examiner

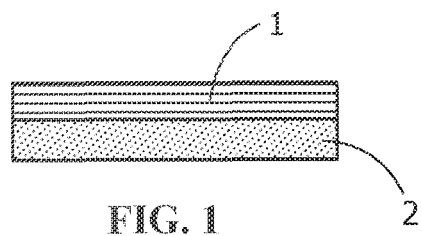
FIG. 1
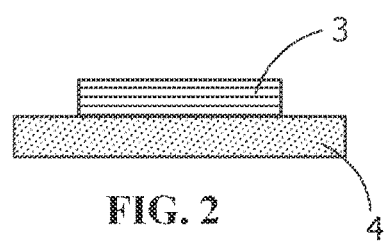
FIG. 2
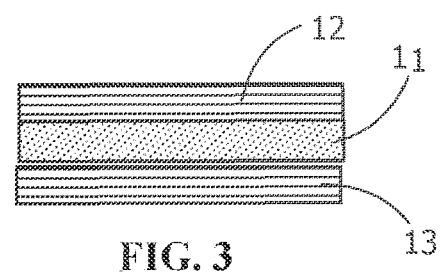
FIG. 3
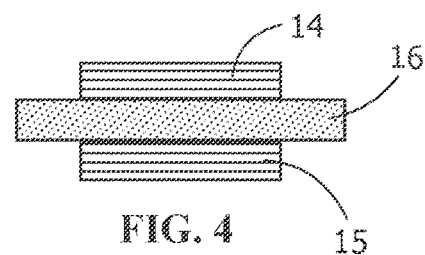
FIG. 4
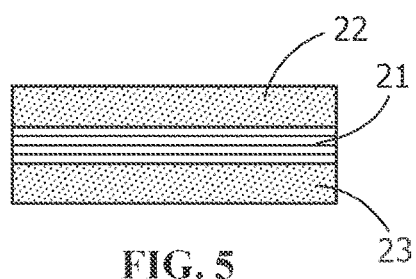
FIG. 5
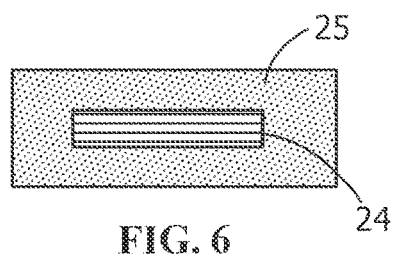
FIG. 6
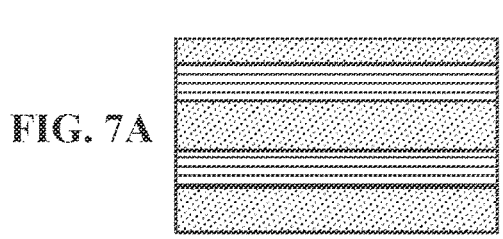
FIG. 7A
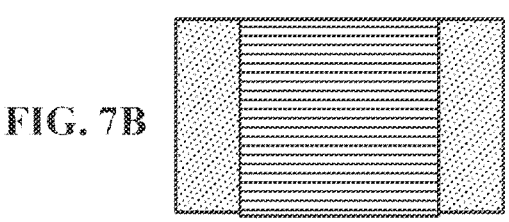
FIG. 7B
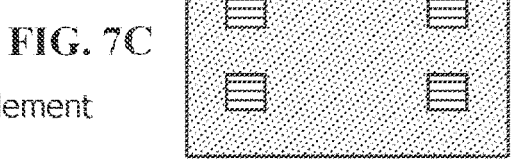
FIG. 7C
FIG. 7
▬ Higher electrical conductivity element
▬ Mechanically strong element

METALLIC STRUCTURE WITH DESIRED COMBINATIONS OF MECHANICAL AND ELECTRICAL CHARACTERISTICS

CROSS REFERENCE TO RELATED APPLICATIONS

This non-provisional application claims the benefit under 35 U.S. Code § 119(e) of Provisional Application Ser. No. 62/817,098 filed Mar. 12, 2019 entitled METALLIC STRUCTURE WITH DESIRED COMBINATIONS OF MECHANICAL AND ELECTRICAL CHARACTERISITICS and whose entire disclosure is incorporated by reference herein.

FIELD OF THE INVENTION

The present invention is directed to a metallic structure that combines higher electrical conductivity elements with mechanically stronger elements to achieve desired conductivity as well as mechanical characteristics of the metallic structure.

BACKGROUND OF THE INVENTION

Copper is used for electrical and electronic purposes in the world as a cost-effective and reliable conductive material for many applications. Copper is only second to silver in its ability to conduct electricity. Substantial research efforts have been devoted to enhance the conductivity of copper by making composites of copper with carbon nanotubes or graphene to form ultraconductive copper. Ultraconductive copper has promises of enhanced electrical conductivity, higher strength and better thermal management characteristics.

U.S. Patent Publication No. 2018/0330842 A1 describes a layered metal-graphene-metal nanolaminate electrical connector with improved wear performance and reduced friction. The electrical connector has a chemical vapor deposition monolayer graphene sheet sandwiched between two copper layers resulting in a decrease in the coefficient of friction and in improvement in wear resistance of an electrical contact.

U.S. Patent Publication No. 2018/0102197 A1 describes a composite structure having a copper layer and a first and second graphene layer that sandwiches the copper layer. The composite structure provides electron path tunnels between the copper layer and the first and second graphene layers. The electron path tunnels may enhance the bulk electrical conductivity. This publication also describes a multilayer composite structure which comprises a first copper layer, a first graphene layer on the first copper layer, a second graphene layer on the first graphene layer and a second copper layer on the second graphene layer.

The report, "Priority Research Areas to Accelerate the Development of Practical Ultraconductive Copper Conductors" by Lee and Burwell (ORNL/TM-2015/403) describes ultraconductive copper materials. The report states that many processes that are being developed to produce ultraconductive materials are not shaped for commercial applications, such as wires. The report further notes that use of carbon nanotubes in existing processes to produce wire has been unsuccessful due to separation of the carbon nanotube inclusions from the melt due to differences in carbon nanotube and copper densities resulting in inhomogenous distribution of the carbon nanotubes. The report also discusses combining ultraconductive copper synthesis with wire formation in a single process. According to the report, attempts have been made to deposit copper electrolytically into wire. The authors of the report question the viability of such a process due to the high process costs and necessary post processing treatment steps. The report does not address the enhanced RF conductivity of an ultraconductive copper material that is made into a cylindrical configuration.

U.S. Pat. No. 10,173,253 describes a method for the development of commercial scale nano-engineered ultraconductive copper wire. When forming ultraconductive wire, multi-walled carbon nanotubes are dispersed and de-agglomerated in hot metal. The multi-walled carbon nanotubes are dispersed in a precursor matrix via mixing and sintering to form a precursor material which is hot extruded multiple rounds at a predetermined temperature to form a nano-composite material. The nano-composite material is subjected to multiple rounds of hot extrusion to form a ultraconductive material which is then drawn to form an ultraconductive wire.

Chinese Patent Application No. CN 105097063A describes a high strength, high conductivity copper or copper alloy wire containing graphene. The wire includes a copper or copper alloy wire core containing a reinforcing phase and a graphene film grown on the outside of the wire core. The reinforcing phase is one or more of graphene, carbon nanotubes and ceramics.

Chinese Patent Application No. CN 102560415A discloses a three-dimensional graphene/metal wire or wire composite structure and the method of preparing such a structure. The metal wire or wire composite structure has a graphene coating having a diameter of 10 nm to 5000 microns and graphene layers from 1 to 100. This structure has good electrical conductivity and corrosion resistance.

None of these references disclose a metallic structure having a higher electrical conductivity element with a mechanically strong element having a desired combination of electrical and mechanical properties based upon the end application of the composite structure.

It would, therefore, be beneficial to provide a composite metallic structure which combines higher electrical conductivity elements with mechanically stronger elements to obtain a desired combination of electrical and mechanical properties.

SUMMARY OF THE INVENTION

An aspect of the invention relates a metallic structure with a desired combination of a higher electrical conductivity element with a mechanically stronger element Another aspect of the invention relates to a metallic structure having a mechanically stronger element in the center with a higher electrical conductivity element on each side of said mechanically stronger element.

Another aspect of the invention relates to a metallic structure having a higher electrical conductivity element in the center with a mechanically stronger element on each side of the higher electrical conductivity element.

Yet another aspect of the invention relates to a power connector comprised of higher conductivity element plates and a mechanically strong element.

Another aspect of the invention relates to a terminal connector having a mechanically strong element with higher electrical conductivity strips applied around the contact.

Another aspect of the invention relates to an insulation displacement connector made of a mechanically stronger element having a higher conductivity element in the terminal.

Yet another aspect of the invention relates to a higher conductivity element used within the crimp zone of a cylindrical receptacle and tab of a connector.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 shows a cross sectional view of a metallic structure having one higher electrical conductivity element with one mechanically strong element.

FIG. 2 shows a cross sectional view of a metallic structure in which the higher electrical conductivity element does not extend the entire cross section of the mechanically strong element.

FIG. 3 shows a cross sectional view of a metallic structure according an alternate embodiment of the invention in which the mechanically strong element is surrounded by two higher electrical conductivity elements.

FIG. 4 shows a cross sectional view of a metallic structure according to an alternate embodiment of the invention in which the mechanically strong element is surrounded by two higher electrical conductivity elements and the cross section of the mechanically strong element is longer than the cross sections of the higher electrical conductivity elements.

FIG. 5 shows a cross sectional view of a metallic structure according to an alternate embodiment of the invention in which two mechanical strong elements surround a higher electrical conductivity element.

FIG. 6 shows a cross sectional view of a metallic structure according to an alternate embodiment in which the higher electrical conductivity element is embedded in a mechanical strong element.

FIGS. 7(A), 7(B) and 7(C) shows a top sectional view of a metallic structures in which the higher electrical conductivity element is applied to a mechanical strong element in three different configurations.

DETAILED DESCRIPTION OF THE INVENTION

Figure 8:
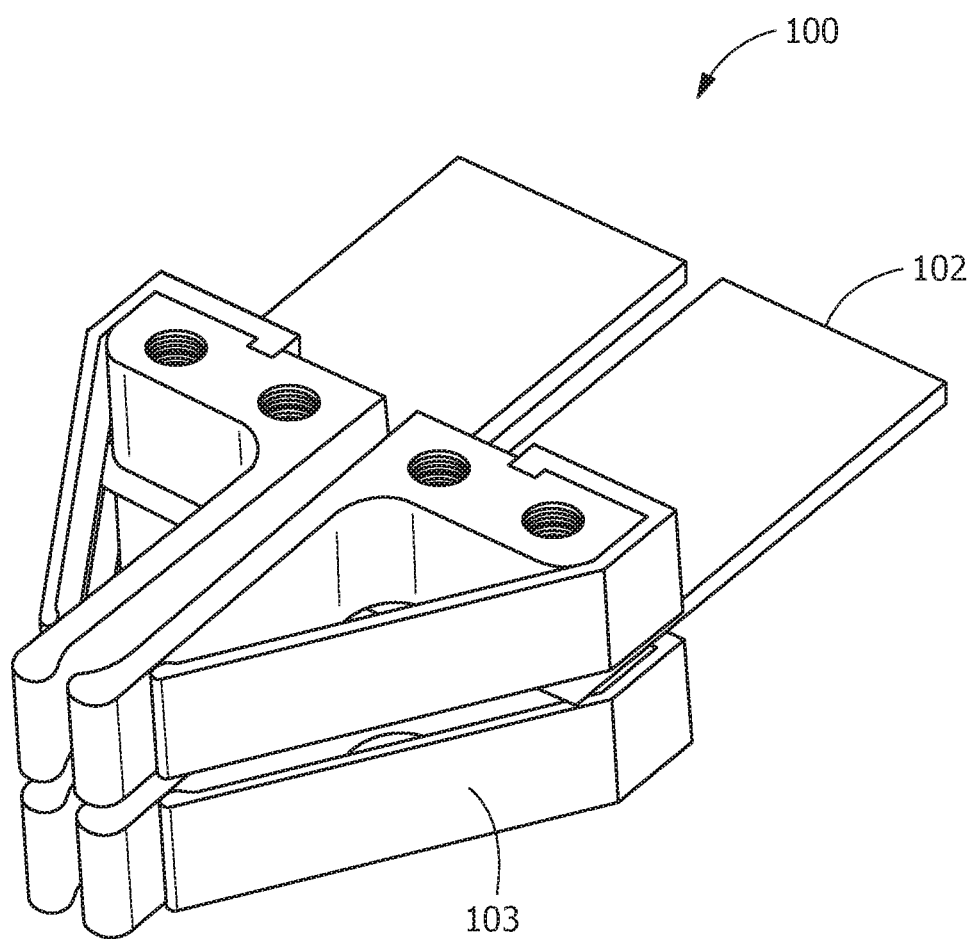
FIG. 8 shows a front perspective view of a power connector comprised of higher electrical conductivity element plates and a mechanically strong element according to the instant invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 12:
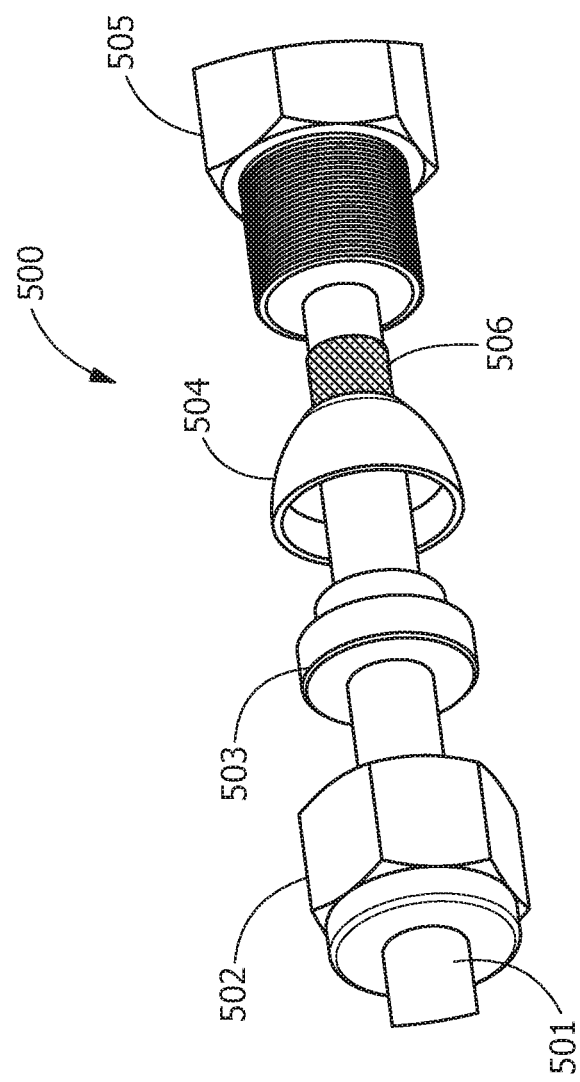
FIG. 12 shows a perspective view of the use of a higher electrical conductivity element used in the end of a stronger mechanical element which is the end of the receptacle and tab in a cylindrical form.

The present invention relates to a metallic structure which combines higher electrical conductivity element with mechanically stronger element. The metallic structure can be a combination of one higher electrical conductivity element with a mechanically stronger element in a layered stack as shown in FIG. 1 or in a coaxial structure as shown in FIG. 12. FIG. 1 shows a metallic structure comprised of layer of higher electrical conductivity 1 and a mechanically strong element 2. In FIG. 2, the length of the cross section of the higher electrical conductivity element 3 is shorter than the length of the cross section of the mechanically strong element 4. Determining the appropriate cross section of each of the two elements of the metallic structure can easily be determined by one of ordinary skill in the art.

Alternatively, the metallic structure can be comprised of a mechanically strong element embedded between two layers of higher electrical conductivity elements as shown in FIGS. 3 and 4. FIG. 3 shows a cross sectional view of a layer of mechanically strong element 11 between two higher electrical conductivity elements 12 and 13. FIG. 4 shows yet another embodiment of a metallic structure in which the length of the cross section of the conductive elements 14 and 15 is shorter than the length of the cross section of the mechanically strong layer 16.

In yet another embodiment, the metallic structure can be comprised of three elements such as a layer of higher electrical conductivity element embedded between two layers of mechanically strong elements as shown in FIGS. 5 and 6. FIG. 5 depicts a higher electrical conductivity element 21 between two mechanically strong elements 22, 23. FIG. 6 shows a metallic structure in which the higher electrical conductivity element 24 is embedded within a mechanically strong layer 25.

The higher electrically conductive element can be applied in many different ways to the mechanically strong layer. FIGS. 7(A), 7(B) and 7(C) shows various configurations that are possible. For example, the electrically conductive element can be applied in thin strips as shown in FIG. 7A. Alternatively, a rectangular strip can be used as shown in FIG. 7B. Finally, the electrically conductive element can be applied as separate discrete configurations as shown in FIG. 7C. In addition, any other configuration of metallic structure with other layers, provided that there is at least one higher electrical conductivity element and one mechanically strong element is envisioned provided that the metallic structure achieves the desired electrical and mechanical characteristics.

The higher electrical conductivity material of the present invention can be made of a higher electrical conductivity material. Preferably, the higher electrical conductivity material is an ultraconductive copper composite. Most preferably, the ultraconductive copper composite is made of graphene and copper. Any ultraconductive copper composite material of graphene can be used. U.S. Patent Publication No. 2018/0102197 provides one example of an ultraconductive copper composite material that can be used in the instant invention. Alternatively, co-pending application Ser. No. 16/816,493, filed concurrently herewith, entitled "Enhanced Performance Ultraconductive Copper" describes another material that can be used for the higher electrical conductivity material.

For example, the higher electrical conductivity element made of ultraconductive copper composite comprises at least two composite layers. The first composite layer has a first copper layer with a first graphene coating. The second composite layer has a second copper layer with a second graphene coating. The two composite layers are stacked together so that the first graphene coating abuts the second graphene coating to form a first interface. If desired to have enhanced RF conductivity of the metallic structure, then the first interface is sufficiently close to the top of the metallic structure.

Graphene (GR) is a one atom thick two dimensional carbon material that is currently used in electrical, thermal and mechanical applications. The carbon atoms in graphene are covalently bonded in a honeycomb (hexagonal) lattice. Graphene is very thin and flexible, yet conductive. Any amount of graphene coverage or structure of graphene that will provide the desired enhancement of the electrical conductivity in the end product can be used. In one embodiment, the graphene surface coverage can be approximately 95% of the surface of the composite layer. In another embodiment, the graphene layer can be the additive resultant layer of graphene from each of the composite layers when stacked. In yet another embodiment, the graphene may be a graphene monolayer or a graphene bi-layer or a few layers of graphene provided that the layers maintain the properties of graphene. Although the higher electrical conductivity element of this invention is described for with an ultraconductive copper composite made with graphene, it is equally possibly applicable to inhomogenous copper-carbon nanotube structures which confer analogous improvements in bulk conductivity. One of ordinary skill in the art would be able to use the carbon nanotube structures in place of graphene.

The two composite layers of the ultraconductive copper composite all include a layer of copper. Copper can be obtained in various thicknesses. The thickness of the copper layer can be determined by the type of desired electrical conductivity improvement. If RF conductivity is critical for the end application, the first copper layer can be formed of copper, provided its thickness is less than the skin depth at the desired frequency, as a sufficiently thin copper layer is critical to enhance the RF conductivity. Additionally, the roughness of the exterior surface of the copper should be low, so as to minimize RF conductivity loss, preferably less than the skin depth over the frequency range of interest.

Typically, copper foils below 5 microns are too fragile and cannot be handled as individual layers. In such instances, copper can be placed or deposited on a removable carrier substrate. Any removable carrier substrate can be used provided that it can mechanically tolerate the graphene deposition temperature; not interdiffuse with copper during processing in such a way to interfere with graphene growth, has a similar coefficient of expansivity to copper to limit distortion during temperature changes and is removable by a chemical or mechanical process, preferably one that would be selective to the carrier material. Preferably, the carrier substrate would have a thickness of at least 20 to about 30 microns. Suitable methods to place or deposit on a carrier substrate include electro-deposition, sputtering, laminating, rolling. U.S. Pat. No. 6,770,976 B2 describes an example of a method for forming a relatively thin release layer of copper on a carrier substrate. These methods are well known in the art and one of ordinary skill in the art can easily choose the best method to achieve the desired result. If a substrate is used with the copper, the substrate must be easily removable from the copper without damage to the copper itself.

The second copper layer can be entirely copper or copper on a core layer. Examples of a core layer include copper nickel silicon alloy, alumina ceramic or stainless steel.

If the thickness of the copper between the exterior surface and the first interface is too thick to achieve the enhanced electrical conductivity, then the thickness of the first copper layer can be reduced to fall below the skin effect at the desired frequency. Examples of methods used to reduce the thickness of the first copper layer and the third copper layers include chemical etching, electrochemical etching, uniform mechanical polishing or chemical mechanical planarization. EP Patent Application 0342 669A2 provides an example of an etch method that can be used. These methods are well known in the art and one of ordinary skill in the art can easily choose the method to use to reduce the thickness of the first copper layer to the desired thickness, while maintaining, or even improving, the smoothness of the final copper surface. Determining the appropriate thickness of the first copper layer of the first composite layer on the frequency of the end application would be well within the skill of one of ordinary skill in the art.

The first composite layer of the ultraconductive copper composite comprises a first copper layer and a first graphene layer. At least a part of the first copper layer used in this invention must have an appropriate crystallographic orientation. A first graphene layer is deposited or grown on the first copper layer using chemical vapor deposition to form the first composite layer.

Graphene is deposited on the conductor. Any method to deposit or grown graphene on the conductor can be used. An example of a suitable process is the chemical vapor deposition process.

Chemical vapor deposition (CVD) can be used to deposit the graphene on the copper layer. CVD provides for growth of large areas of graphene that conform to the copper layer. CVD occurs in a hydrogen/argon atmosphere. Methane is introduced as a precursor gas into a quartz tube so that the methane reacts to provide atomic carbon, which is deposited on the copper layer. Alternatively, any other precursor gas such as ethylene, acetylene, ethane or propane can be used to provide atomic carbon to the copper layer. The resulting graphene film is polycrystalline and may possibly have defects in the form of a one-dimensional grain boundary. CVD of the graphene may be conducted at temperatures from about 800° C. to about 1085° C. for about a period of 15 to about 45 minutes. Most preferably, the CVD is conducted at a temperature of about 900° C. to about 1085° C.

Alternatively, it is possible to use arc-evaporation and plasma enhanced CVD to deposit the graphene on the cooper layer. The conditions for these methods would be will within the skill of one of ordinary skill in the art.

In yet another embodiment, the higher electrical conductivity material of the present invention comprises an ultra-conductive copper composite, having preferably comprises three composite layers. The first composite layer includes a first copper layer and a first graphene layer on one side of the first copper layer. The second composite layer has a second copper layer with a second graphene on one surface of the second copper layer and a third graphene layer on the opposing surface of the second copper layer. The third composite layer includes a third copper layer with a fourth graphene layer on one side of the third copper layer.

The second composite layer has two graphene layers, one on each side of the second copper layer. The thickness of this second composite layer is well within the skill of one of ordinary skill in the art, so long as the second composite layer enables graphene growth on the layer. In one example, the second copper layer is a thick layer of copper which provides for significant structural rigidity. Alternatively, a core layer with copper on both sides of the core layer is used for the second copper layer. An example of such a core layer includes a copper nickel silicon alloy, alumina ceramic or stainless steel. Graphene is then deposited on the both surfaces of the second copper layer using CVD resulting in a second composite layer for the ultraconductive copper composite.

The third composite layer comprises a third copper layer and a fourth graphene layer on one side of the third copper layer. At least a part of the third copper layer used in this invention must have an appropriate crystallographic orientation. A fourth graphene layer is provided on the third copper layer using chemical vapor deposition to form the third composite layer.

The first composite layer is stacked with the second composite layer so that the first graphene layer of the first composite layer abuts the surface of the second graphene layer of the second composite layer. The third composite layer is stacked on the opposite side of the second composite layer so that the fourth graphene layer of the third composite layer abuts the third graphene layer of the second composite layer. Any carrier materials for the first copper layer and the third copper layer are removed prior to use of the ultraconductive copper composite. The type of method used to remove the carrier material would be dependent upon the structure of the carrier itself, so long as the method does not damage the first copper layer and the third copper layer and can be easily determined by one of ordinary skill in the art.

Although a ultraconductive copper composite which can be used as the higher electrical conductivity element of this invention is described with at least two composite layers as well as three composite layers above, any multi-layer ultraconductive composite structure with as many layers as desired can be formed and used as the higher conductivity electrical element.

The mechanically stronger element of the metallic structure can be any material that provides strength for the desired end metallic structure while at the same time maintaining the desired combination of electrical and mechanical characteristics. Examples of such mechanically stronger materials include copper alloys, brass, bronze, beryllium copper and Corson Copper alloys, steel, stainless steel, aluminum, aluminum alloys, titanium, tungsten, molybdenum, nickel or any alloy thereof. Alternatively, the mechanically stronger element can be a ceramic material. Using a ceramic material would further enhance the overall thermal conductivity anisotropy of the metallic structure.

Optionally, the surface of the mechanically stronger element of the metallic structure can have a layer of graphene on such mechanically stronger element. In order to grow such a graphene layer, a layer of material suitable for graphene growth on such mechanically stronger element may need to be applied to such mechanically stronger element. Copper is a layer of material that is suitable for graphene growth. The choice of such material and its application to the mechanically stronger element is well within the skill of one of ordinary skill in the art. Any suitable CVD method can be used to deposit the graphene on such material.

The higher electrical conductivity element can be joined with the mechanically stronger element to form a metallic structure. Any known mechanical cladding method can be used. Alternatively, a hot pressing process can be used. Hot-pressing may be performed at a temperature in the range of 800° C. to about 1000° C. Preferably, the layers are hot pressed in a graphite mold at 900° C. for 20 minutes at 50 mPa argon atmosphere. If a ceramic material is used for the mechanically stronger element, the mechanically stronger element and the higher electrical conductivity element would be formed as a clad laminate. Alternatively, any other method used to join the mechanically stronger element with the higher electrical conductivity element can be used. Such other methods would be well within the skill of one of ordinary skill in the art.

In the alternative, an additional surface layer of copper can be applied to the mechanically stronger element if the higher electrical conductivity element is joined to the mechanically stronger element by a hot pressing process. The type of copper, its thickness and its application to the mechanically stronger element is well within the skill of one of ordinary skill in the art. Furthermore, if desired, a layer of graphene can be grown on this additional copper layer on one or both sides. Any suitable CVD method can be used to deposit the graphene on such copper layer.

The metallic structure of the present invention can be used in all types of connectors, busbars, relays, and cables. The higher electrical conductivity element could be located in the separable interface zones, and the body of an electrical connector, only at the surface within the separable interface zones, or only at certain locations within the body of the connector.

The selection of the thickness of the mechanically stronger element and the higher electrical conductivity element is based upon the desired values of the two elements and the end use of the material. The higher the value in either property, the lower the relative thickness of a given material would be required to product a final structure with the desired combination of mechanical/electrical properties. One of ordinary skill in the art would be able to determine the thickness of each element easily depending upon the final application of the composite.

For example, the metallic structure of the instant invention can be used in a power connector for a busbar 100 as shown in FIG. 8. The connector comprises a stack of individual plates 102 made of higher electrical conductivity element. Each of these plates can be cut into a profile which contains a radius that serves as a stable point of electrical contact. Once the plates are stacked together, a mechanically stronger element 103 can be used to contact with the radius of the profiled plates. This mechanically stronger element will provide the normal force needed to make a stable contact. In this embodiment, the mechanically stronger element 103 is a spring.

Figure 9:
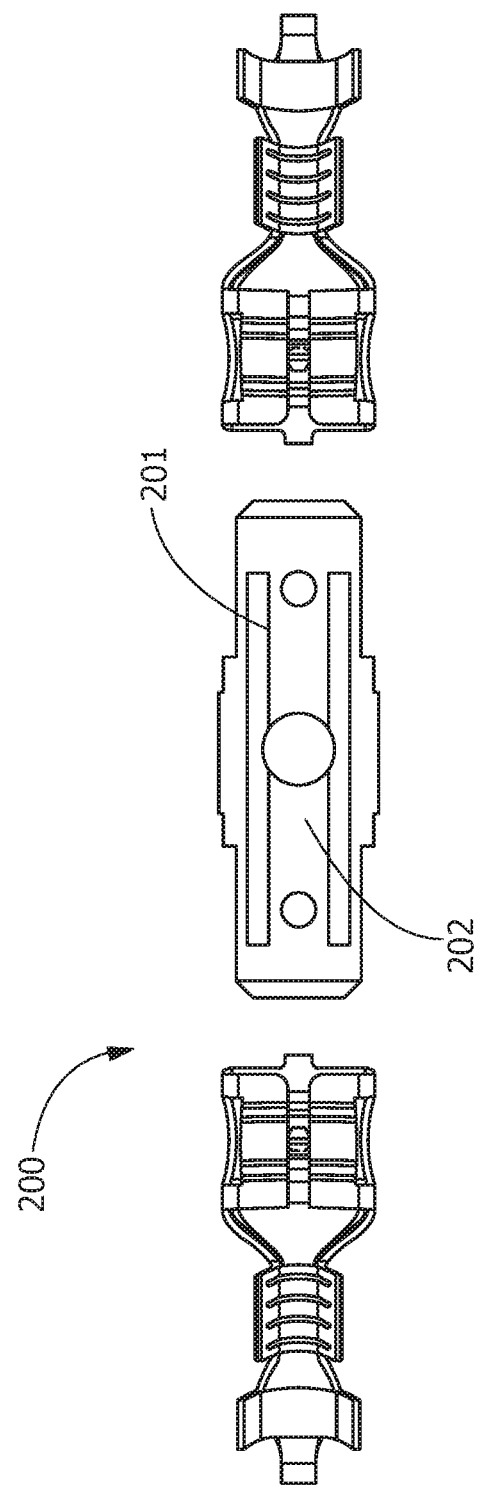
FIG. 9 shows a top view of a terminal connector comprised of a mechanically strong element having higher electrical conductivity element strips applied around the contact of the connector.

In another example, the metallic structure can be used in a connector terminal 200. For example, as shown in FIG. 9, the higher conductivity element 201 can be placed in the contact zone 202 of the terminal made from a brass alloy which has relatively low conductivity. Adding the higher conductivity element 201 in such a connector terminal may improve the conductivity of the connector. In addition to providing beneficial electrical characteristics, if the higher electrical conductivity material contains graphene it may also reduce the coefficient of friction to lower insertion or assembly forces. Also if the higher electrically conductive material includes an ultraconductive material with graphene, the graphene may improve the corrosion resistance if the terminals are made of tin.

Figure 10:
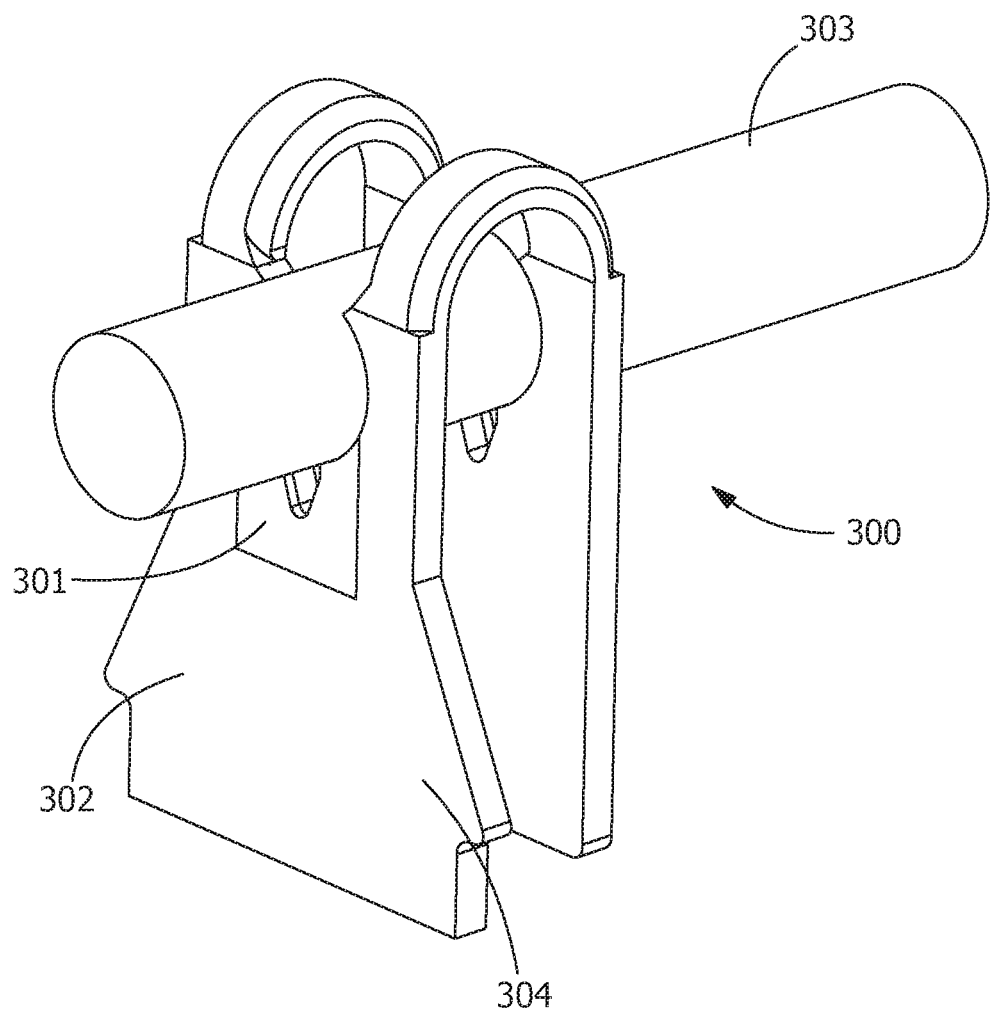
FIG. 10 shows a perspective view of an insulation displacement connector made of a mechanically strong element having a higher electrical conductivity element in the terminal.

Alternatively, the metallic structure of the instant invention can be used in an insulation displacing connector 300 as shown in FIG. 10. The insulation displacing connector 300 can have a higher electrical conductivity element 301 in its terminal 302 which comprises a mechanically stronger element 304. FIG. 10 shows wire 303 in the insulation displacing connector 300 of the instant invention.

Figure 11:
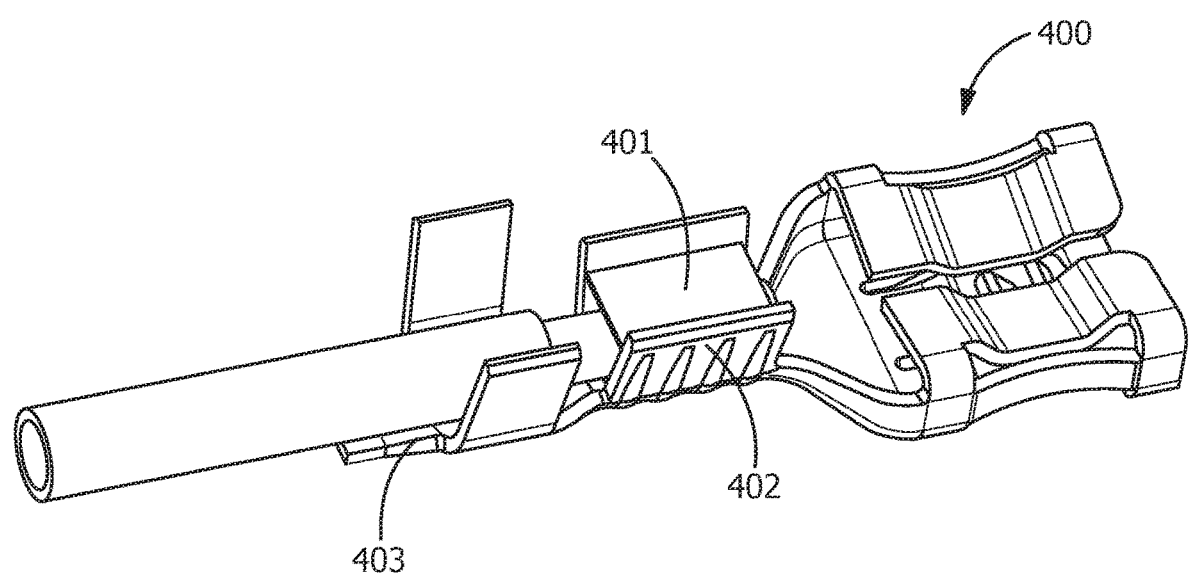
FIG. 11 shows a perspective view of the use of a higher electrical conductivity element embedded in the mechanically stronger element of a wire crimp area.

Similarly, the instant invention can be used in compression applications so that these applications have better electrical function. The higher electrical conductivity element improves or lowers the resistance across such compression applications. One such example of a compression application is a wire crimp connector having a mechanical stronger element 403. An embodiment of a wire crimp connector 400 can be found in FIG. 11. FIG. 11 shows a higher electrically conductive material 401 placed in the area of the wire crimp 402. The higher electrically conductive material 401 can be a single strip of material or multiple strips placed throughout the crimp. The amount of the higher electrically conductive can easily be determined by one of ordinary skill in the art to achieve the desired balance of electrical and mechanical properties.

Another compression application which can benefit from the use of the metallic structure of the instant invention is a mechanical screw locking connector. An embodiment of such a mechanical screw locking connector 500 can be found in FIG. 12. The mechanical screw locking connector 500 includes mechanically stronger elements: tab 501, nut 502, back ferrule 503, front ferrule 504 and receptacle tail 505. A higher electrical conductivity element 506 is placed between the tab and the front ferrule 504. The higher electrical conductivity element is mechanically squished/cold welded into the cavity of the receptacle as the connector is put together. Additional higher electrical conductivity elements can be included in the connector to optimize the electrical characteristics of the metallic structure.

The metallic structure of the instant invention can be used in a plate fin heat exchanger. The majority of the thermal resistance in a plate fin heat exchanger is due to the in-plane flow of heat through the base and the fins. As the metallic structure has improved in plane electrical conductivity, the thermal conductivity would likewise be improved. The improved in-plane electrical conductivity of the metallic structure would provide a plate fin heat exchanger with improved thermal properties.

If a ceramic material is used as the mechanically stronger element of the metallic structure, then the metallic structure can be used in various circuit applications.

Figure 13:
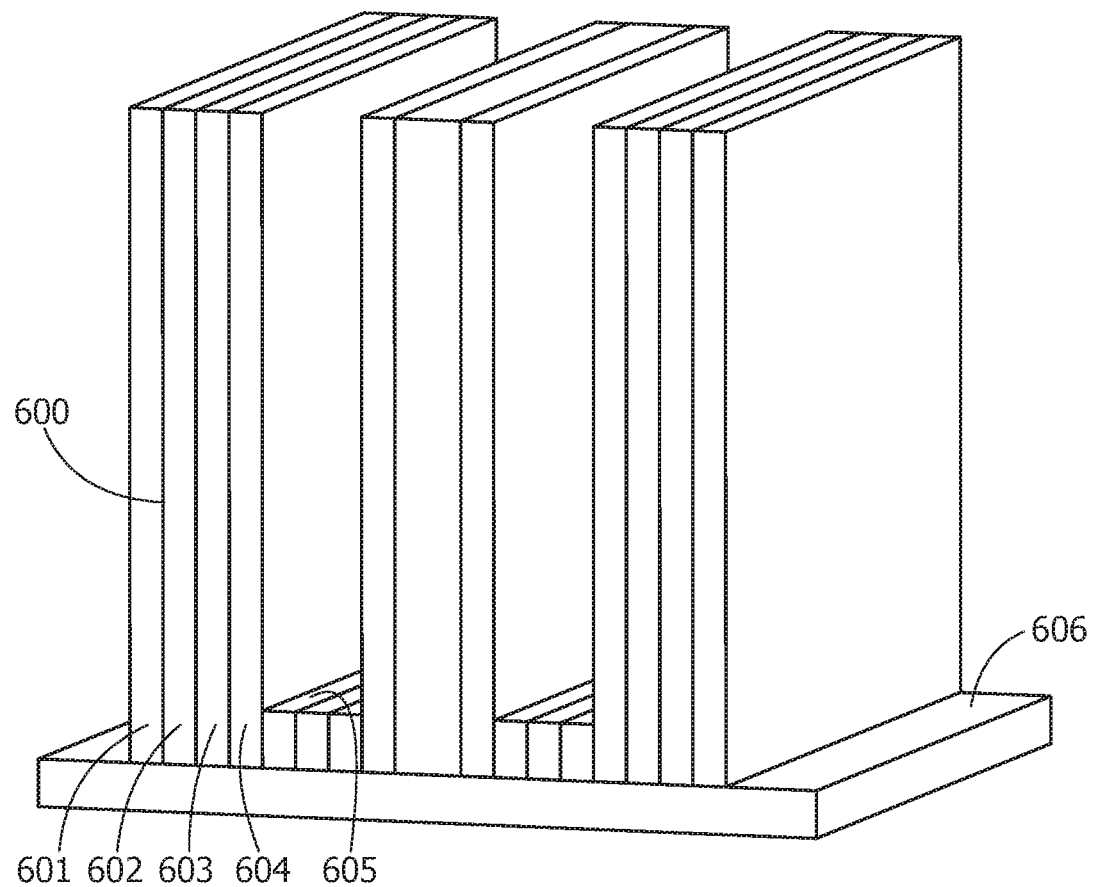
FIG. 13 shows a perspective view of the use of a metallic structure in a heat sink.

Since the metallic structure of the instant invention has improved thermal conductivity as well, the metallic structure can be used a heat sink as shown in FIG. 13 with block 600 made of layers 601, 602, 603, 604, for example, and having milled out channel 605 between the block and attached to a chip or input output module 606. Additionally structures combining a more electrically and thermally conductive material with a ceramic layer may be designed to exhibit enhanced thermal conductivity anisotrophy. The shape and the configuration of the heat sink would be well within the scope of one of ordinary skill in the art.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical terminal comprising a metallic structure having a desired combination of mechanical and electrical characteristics, the metallic structure comprising a mechanically strong element and an electrically conductive element, the electrically conductive element positioned in a contact zone of the terminal, the electrically conductive element having a first composite layer and a second composite layer, the first composite layer having a first coating and the second composite layer having a second coating, a thickness of the first composite layer dimensioned to prevent skin effect in the first composite layer at a desired frequency, the first composite layer and the second composite layer are stacked together so that the first coating abuts the second coating.

2. The electrical terminal according to claim 1, wherein said electrically conductive element is an ultraconductive copper composite.

3. The electrical terminal according to claim 2, wherein said first composite layer is copper with the first coating of graphene.

4. The electrical terminal according to claim 2, wherein said second composite layer is copper with the second coating of graphene.

5. The electrical terminal according to claim 1, wherein said metallic structure is cylindrical.

6. The electrical terminal according to claim 1, wherein said metallic structure is a power connector for a busbar.

7. The electrical terminal according to claim 1, wherein said metallic structure is incorporated into an insulation displacing connector.

8. The electrical terminal according to claim 1, wherein said metallic structure is incorporated into a wire crimp connector.

9. The electrical terminal according to claim 1, wherein said metallic structure is incorporated into a mechanical screw locking connector.

10. The electrical terminal according to claim 1, wherein said metallic structure is a heat sink.

11. An electrical terminal comprising a metallic structure having a desired combination of mechanical and electrical characteristics, the metallic structure comprising a first mechanically strong element, a second mechanically strong element and an electrically conductive element between said first mechanically strong element and said second mechanically strong element, the electrically conductive element positioned in a contact zone of the terminal, the electrically conductive element having a first composite layer and a second composite layer, the first composite layer having a first coating and the second composite layer having a second coating, a thickness of the first composite layer dimensioned to prevent skin effect in the first composite layer at a desired frequency, the first composite layer and the second composite layer are stacked together so that the first coating abuts the second coating.

* * * * *